(12) United States Patent
Han et al.

(10) Patent No.: US 11,726,916 B1
(45) Date of Patent: Aug. 15, 2023

(54) METHOD, COMPUTER PROGRAM PRODUCT, AND COMPUTING SYSTEM FOR DEFINING A NORMAL IO WRITE MODE AND HANDLING REQUESTS TO ENTER A TESTING IO WRITE MODE

(71) Applicant: EMC IP Holding Company, LLC, Hopkinton, MA (US)

(72) Inventors: Geng Han, Beijing (CN); Vladimir Shveidel, Pardes Hana (IL); Uri Shabi, Tel Mond (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/730,473

(22) Filed: Apr. 27, 2022

(51) Int. Cl.
*G06F 12/08* (2016.01)
*G06F 12/0842* (2016.01)
*G06F 12/02* (2006.01)

(52) U.S. Cl.
CPC ...... *G06F 12/0842* (2013.01); *G06F 12/0238* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 6,732,124 B1* | 5/2004 | Koseki | G06F 12/0868 711/119 |
| 2012/0233123 A1* | 9/2012 | Liu | G06F 11/004 707/E17.007 |
| 2020/0349072 A1* | 11/2020 | Fliess | G06F 12/0868 |

\* cited by examiner

*Primary Examiner* — Tracy C Chan
(74) *Attorney, Agent, or Firm* — Brian J. Colandreo; Heath M. Sargeant; Holland & Knight LLP (57) ABSTRACT

A method, computer program product, and computing system for defining a normal IO write mode for writing data to a storage system including: writing the data to a cache memory system of a first storage node, writing the data to a journal of the first storage node, sending a notification concerning the data to a second storage node, writing one or more metadata entries concerning the data to a journal of the second storage node, sending an acknowledgment signal to the host device, and writing the data to the storage array. A request may be received to enter a testing IO write mode. In response to receiving the request, the data may be written to the cache memory system. The writing of the data to the journal may be bypassed. The acknowledgment signal may be sent to the host device. The data may be written to the storage array.

20 Claims, 8 Drawing Sheets

METHOD, COMPUTER PROGRAM PRODUCT, AND COMPUTING SYSTEM FOR DEFINING A NORMAL IO WRITE MODE AND HANDLING REQUESTS TO ENTER A TESTING IO WRITE MODE

BACKGROUND

Storing and safeguarding electronic content may be beneficial in modern business and elsewhere. Accordingly, various methodologies may be employed to protect and distribute such electronic content.

For example, conventional performance test procedures for a storage system require tested storage systems to be "aged" (i.e., the storage system should emulate real world systems). To address this challenge, the storage system may be pre-filled during testing with regular input/output (IO) workload (with a particular pattern to represent a real world system) issued by the test environment host. However, the rate of prefilling is limited by the storage system performance and, normally, the prefill process requires a significant amount of time. As such, conventional approaches utilize many storage nodes to complete some set of tests in reasonable time. Addressing these challenges, conventional approaches require prolonging testing time or increasing the number of storage nodes required in the development/testing process.

SUMMARY OF DISCLOSURE

In one example implementation, a computer-implemented method executed on a computing device may include, but is not limited to, defining a normal IO write mode for writing data to a storage system, the normal IO writing mode including: writing the data to a cache memory system of a first storage node, writing the data to a journal of the first storage node, sending a notification concerning the data to a second storage node, writing one or more metadata entries concerning the data to a journal of the second storage node, in response to writing the one or more metadata entries concerning the data to the journal of the second storage node, sending an acknowledgment signal to the host device, and writing the data from the cache memory system to the storage array. A request may be received to enter a testing IO write mode. In response to receiving the request, the data may be written to the cache memory system. The writing of the data to the journal of the first storage node may be bypassed. The acknowledgment signal may be sent to the host device in response to writing the data to the cache memory system. The data may be written from the cache memory system to the storage array.

One or more of the following example features may be included. The journal may include one or more non-volatile random access memory (NVRAM) devices. The request for the storage system to enter the testing IO write mode may include at least one of: a predefined start time for entering the testing IO write mode and a predefined end time for returning to the normal IO write mode. A selection of a test to perform on the storage system may be received when in the testing IO write mode. An amount of data to write to the storage system may be determined based upon, at least in part, the selected test. The storage system may include two storage nodes configured in an active-active system, thus defining a multi-node storage system. In response to receiving the request for the storage system to enter the testing IO mode from the normal IO write mode, the writing of the one or more metadata entries concerning the data to the journal of the second storage node may be bypassed. In response to writing the data to the cache memory system, the acknowledgment signal may be sent to the host device. The data may be written from the cache memory system to the storage array.

In another example implementation, a computer program product resides on a computer readable medium that has a plurality of instructions stored on it. When executed by a processor, the instructions cause the processor to perform operations that may include, but are not limited to, defining a normal IO write mode for writing data to a storage system, the normal IO writing mode including: writing the data to a cache memory system of a first storage node, writing the data to a journal of the first storage node, sending a notification concerning the data to a second storage node, writing one or more metadata entries concerning the data to a journal of the second storage node, in response to writing the one or more metadata entries concerning the data to the journal of the second storage node, sending an acknowledgment signal to the host device, and writing the data from the cache memory system to the storage array. A request may be received to enter a testing IO write mode. In response to receiving the request, the data may be written to the cache memory system. The writing of the data to the journal of the first storage node may be bypassed. The acknowledgment signal may be sent to the host device in response to writing the data to the cache memory system. The data may be written from the cache memory system to the storage array.

One or more of the following example features may be included. The journal may include one or more non-volatile random access memory (NVRAM) devices. The request for the storage system to enter the testing IO write mode may include at least one of: a predefined start time for entering the testing IO write mode and a predefined end time for returning to the normal IO write mode. A selection of a test to perform on the storage system may be received when in the testing IO write mode. An amount of data to write to the storage system may be determined based upon, at least in part, the selected test. The storage system may include two storage nodes configured in an active-active system, thus defining a multi-node storage system. In response to receiving the request for the storage system to enter the testing IO mode from the normal IO write mode, the writing of the one or more metadata entries concerning the data to the journal of the second storage node may be bypassed. In response to writing the data to the cache memory system, the acknowledgment signal may be sent to the host device. The data may be written from the cache memory system to the storage array.

In another example implementation, a computing system includes at least one processor and at least one memory architecture coupled with the at least one processor, wherein the at least one processor configured to defining a normal IO write mode for writing data to a storage system, the normal IO writing mode including: writing the data to a cache memory system of a first storage node, writing the data to a journal of the first storage node, sending a notification concerning the data to a second storage node, writing one or more metadata entries concerning the data to a journal of the second storage node, in response to writing the one or more metadata entries concerning the data to the journal of the second storage node, sending an acknowledgment signal to the host device, and writing the data from the cache memory system to the storage array. A request may be received to enter a testing IO write mode. In response to receiving the request, the data may be written to the cache memory system. The writing of the data to the journal of the first storage node may be bypassed. The acknowledgment signal may be sent to the host device in response to writing the data to the cache memory system. The data may be written from the cache memory system to the storage array.

One or more of the following example features may be included. The journal may include one or more non-volatile random access memory (NVRAM) devices. The request for the storage system to enter the testing IO write mode may include at least one of: a predefined start time for entering the testing IO write mode and a predefined end time for returning to the normal IO write mode. A selection of a test to perform on the storage system may be received when in the testing IO write mode. An amount of data to write to the storage system may be determined based upon, at least in part, the selected test. The storage system may include two storage nodes configured in an active-active system, thus defining a multi-node storage system. In response to receiving the request for the storage system to enter the testing IO mode from the normal IO write mode, the writing of the one or more metadata entries concerning the data to the journal of the second storage node may be bypassed. In response to writing the data to the cache memory system, the acknowledgment signal may be sent to the host device. The data may be written from the cache memory system to the storage array.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
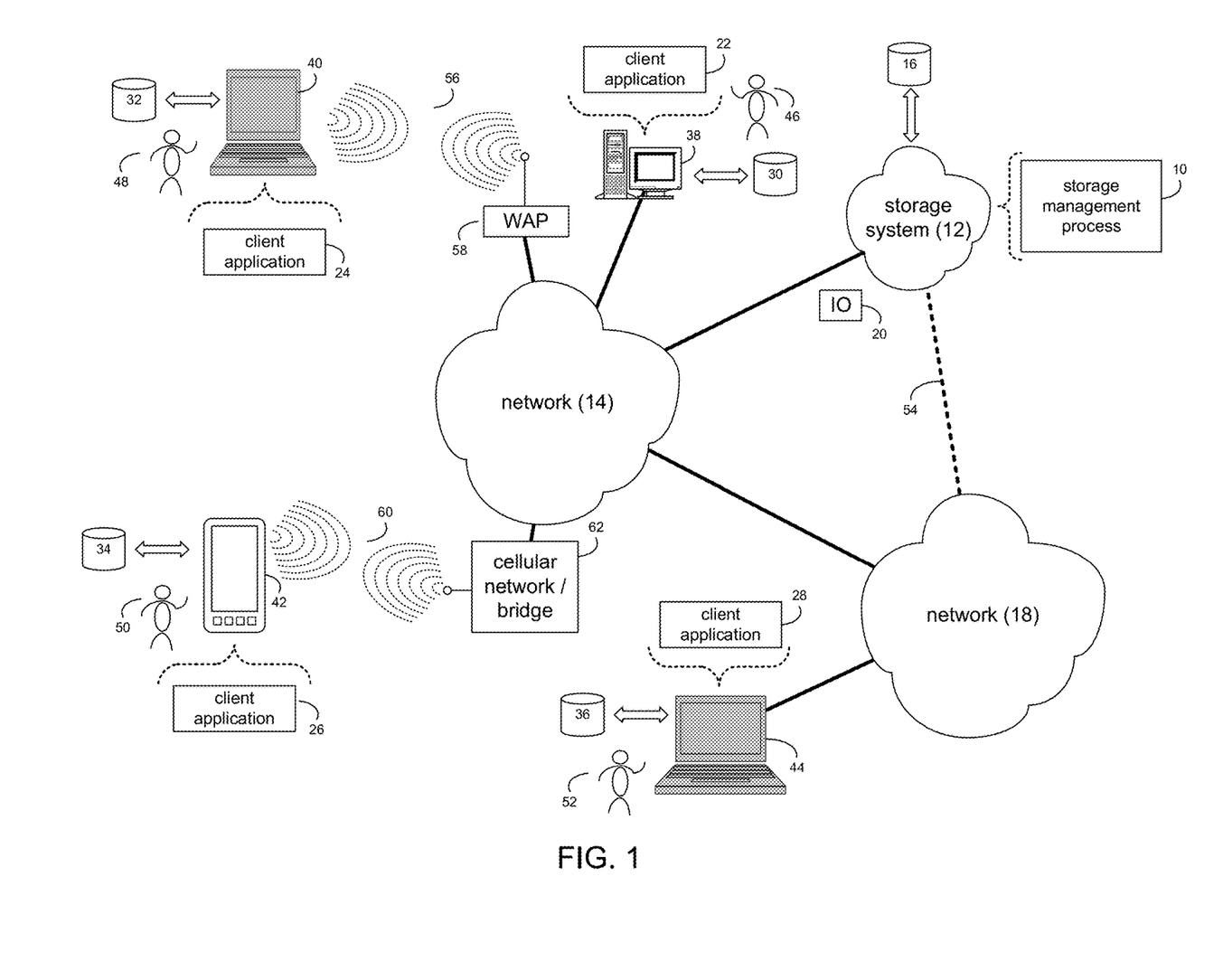
FIG. 1 is an example diagrammatic view of a storage system and a storage management process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage management process, such as storage management process 10 of FIG. 1, may include but is not limited to, defining a normal IO write mode for writing data to a storage system, the normal IO writing mode including: writing the data to a cache memory system; writing the data to a journal; in response to writing the data to the journal, sending an acknowledgment signal to a host device; and writing the data from the cache memory system to a storage array. A request may be received for the storage system to enter a testing IO write mode. In response to receiving the request for the storage system to enter the testing IO mode from the normal IO write mode, the data may be written to the cache memory system. The writing of the data to the journal may be bypassed. The acknowledgment signal may be sent to the host device in response to writing the data to the cache memory system. The data may be written from the cache memory system to the storage array.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
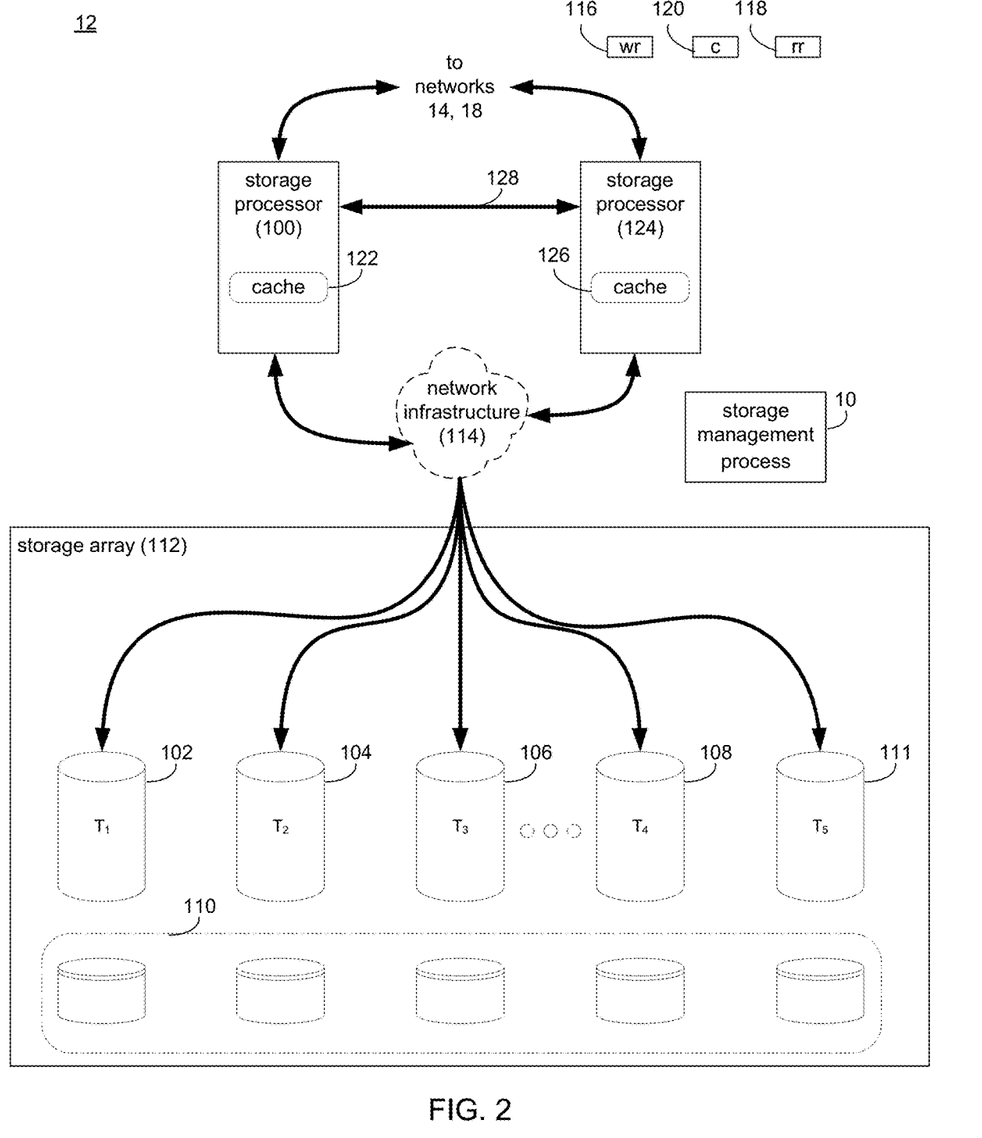
FIG. 2 is an example diagrammatic view of the storage system of FIG. 1 according to one or more example implementations of the disclosure.
Figure 3:
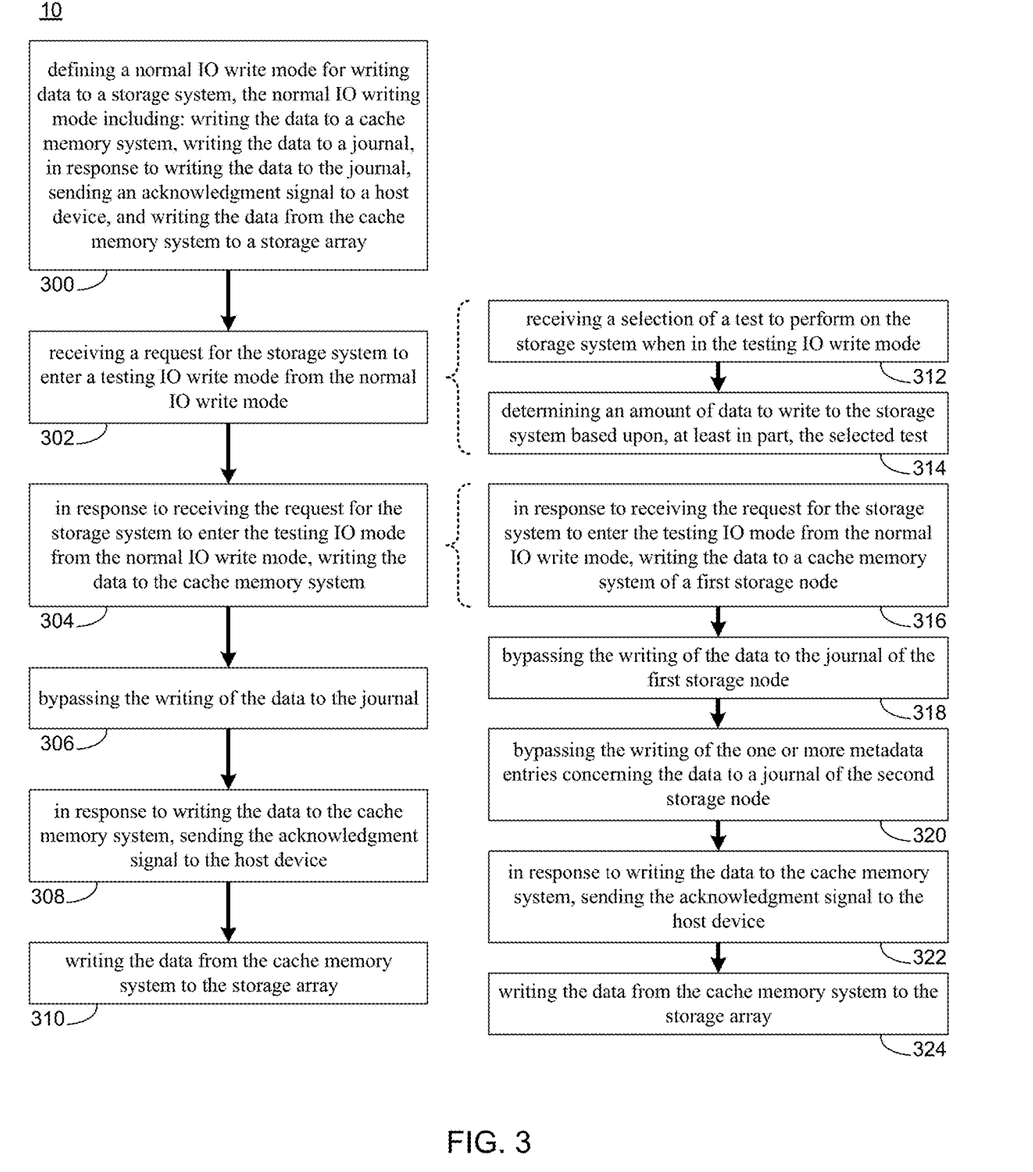
FIG. 3 is an example flowchart of storage management process according to one or more example implementations of the disclosure.
Figure 4:
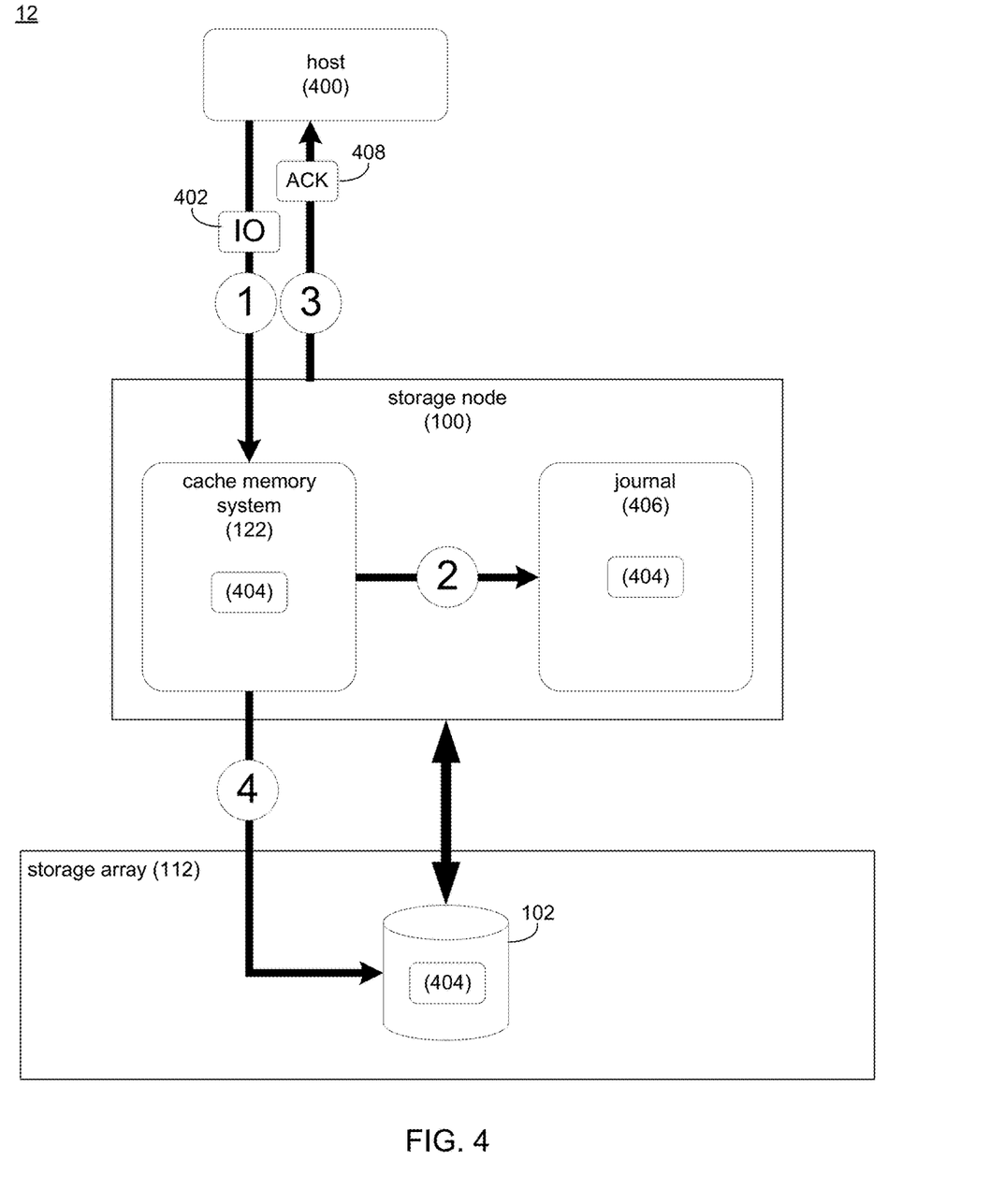
FIGS. 4-7 are example diagrammatic views of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100.

Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Storage Management Process:

Referring also to the examples of FIGS. 3-8 and in some implementations, storage management process 10 may define 300 a normal IO write mode for writing data to a storage system, the normal IO writing mode including: writing the data to a cache memory system; writing the data to a journal; in response to writing the data to the journal, sending an acknowledgment signal to a host device; and writing the data from the cache memory system to a storage array. A request may be received 302 for the storage system to enter a testing IO write mode. In response to receiving the request for the storage system to enter the testing IO mode from the normal IO write mode, the data may be written 304 to the cache memory system. The writing of the data to the journal may be bypassed 306. The acknowledgment signal may be sent 308 to the host device in response to writing the data to the cache memory system. The data may be written 310 from the cache memory system to the storage array.

As will be discussed in greater detail below, implementations of the present disclosure may allow for improved "prefilling" of a storage system during testing of the storage system. For example, conventional performance test procedures for a storage system require tested storage systems to be "aged" (i.e., the storage system should emulate real world systems). To address this challenge, the storage system may be pre-filled during testing with regular input/output (IO) workload (with a particular pattern to represent a real world system) issued by the test environment host. However, the rate of prefilling is limited by the storage system performance and, normally, the prefill process requires a significant amount of time. As such, conventional approaches utilize many storage nodes to complete some set of tests in reasonable time. Addressing these challenges, conventional approaches require prolonging testing time or increasing the number of storage nodes required in the development/testing process.

In some implementations, storage management process 10 may define 300 a normal IO write mode for writing data to a storage system, the normal IO writing mode including: writing the data to a cache memory system; writing the data to a journal; in response to writing the data to the journal, sending an acknowledgment signal to a host device; and writing the data from the cache memory system to a storage array. For example and referring also to FIG. 4, suppose a host (e.g., host 400) sends an IO request (e.g., IO request 402) to write data to a storage array (e.g., storage array 112) using a storage node (e.g., storage node 100). In this example, storage management process 10 may, in the normal IO write mode, write the data (e.g., data 404) to the cache memory system (e.g., cache memory system 122) of the processing storage node (e.g., storage node 100). This is shown as "1" in FIG. 4.

Storage management process 10 may write the data (e.g., data 404) to a journal (e.g., journal 406). A journal (e.g., journal 406) may include one or more non-volatile random access memory (NVRAM) devices configured to provide a log of the data written to storage array. For example, the contents of the journal may be preserved in the event of a power failure or other failure of the cache memory system. In some implementations and in response to the failure of the cache memory system, storage management process 10 may recover data 404 from the journal (e.g., journal 406). This is shown as "2" in FIG. 4.

However, this journaling approach (i.e., preliminary persisting of data for early acknowledgement and/or for better aggregation) is expensive in terms of storage system performance. For example, storage management process 10 may only send an acknowledgment signal (e.g., ACK 408) to the host device (e.g., host device 400) once the data (e.g., data 404) is persisted in non-volatile memory (e.g., journal 406). This is shown as "3" in FIG. 4. At some point in time after writing the data to cache memory system 122 and journal 406, data 404 may be "flushed" or written from cache memory system 122 to the persistent memory of the storage array (e.g., storage array 112). This is shown as "4" in FIG. 4.

The process of persisting the data allows the data to be recovered during a failure or other issue before the data is persisted to the storage array. During normal IO processing (e.g., the normal IO writing mode), the ability to recover data in the event of a failure or other event is extremely important. However, and as will be discussed in greater detail below, during a testing IO mode, the ability to persist and recover data during a failure is less important as the integrity of the data itself is not important (i.e., the pattern and amount of data is more important than the content of the data). In this manner, storage management process 10 may utilize an IO testing mode to selectively avoid or bypass this extended processing of IO write requests associated with normal IO writing.

In some implementations, storage management process 10 may receive 302 a request for the storage system to enter a testing IO write mode from the normal IO write mode. For example and as discussed above, during normal IO writing mode, the processing of IO write requests may include the writing of the IO write data to a non-volatile journal which can introduce delays in the processing of IO write requests while providing data protection against potential storage node failures while data is being persisted to a storage array. However, when testing the storage system, various tests may require certain amounts or distributions of data within the storage system. To utilize normal IO writing procedures as noted above would lower latency while providing unnecessary data protection. However, as the storage system is designed to function primarily in the normal IO writing mode, storage management process 10 may utilize the testing IO write mode to selective bypass the journal (and associated data protection processing) for testing. In this manner, the storage system may be selectively tested in a testing IO write mode that allows for more efficient data processing without fundamentally altering the storage system.

In some implementations, the request to enter a testing IO write mode may include receiving 302 a selection in a user interface. For example, storage management process 10 may provide a user with a graphical user interface and/or command line prompt for entering a request to enter testing IO write mode with various parameters. In one example, the request for the storage system to enter the testing IO write mode may include at least one of: a predefined start time for entering the testing IO write mode and a predefined end time for returning to the normal IO write mode. In this example, by selecting at least a predefined end time, storage management process 10 may reduce the likelihood that a user unintentionally remains in testing IO write mode following the performance of a test. In some implementations, the predefined start and/or end times may be based upon, at least in part, predefined dates and times and/or in response to selecting a particular test and/or in response to concluding a particular test. However, it will be appreciated that various parameters may be used to define the process of entering and/or exiting the testing IO write mode within the scope of the present disclosure.

In some implementations, storage management process 10 may receive 312 a selection of a test to perform on the storage system when in the testing IO write mode. For example, storage management process 10 may provide a graphical user interface and/or command line prompt for selecting a particular test to perform on the storage system when in testing IO write mode. Storage management process 10 may enable a user to upload a test to the storage system and/or may enable a user to search a database of tests to initiate on the storage system. In some implementations, the database of tests may be stored locally within the storage system and/or may be stored remotely while being accessible to storage management process 10.

In some implementations, storage management process 10 may determine 314 an amount of data to write to the storage system based upon, at least in part, the selected test. For example, various tests may have particular requirements. These requirements may include types of data, organizational structures, amounts of data, distribution of data, utilization of data, etc. Accordingly, storage management process 10 may determine the amount of data and/or types of data to write to the storage system in response to selecting a particular test. In one example, suppose that a user selects a predefined test that checks the ability for the storage system to address a case where a data threshold is exceeded (e.g., a data threshold of 80% across the storage array). In this example, storage management process 10 may determine how much data needs to be written to storage system 12 to perform this test. Assume for this example that storage system 12 includes e.g., 10% of the amount of data required. Accordingly, storage management process 10 may write additional data to the storage system until the data threshold of e.g., 80% is exceeded. While an example of a particular test's threshold amount of data has been discussed, it will be appreciated that various amounts and types of data may be determined for use in testing the storage system within the scope of the present disclosure.

Figure 5:
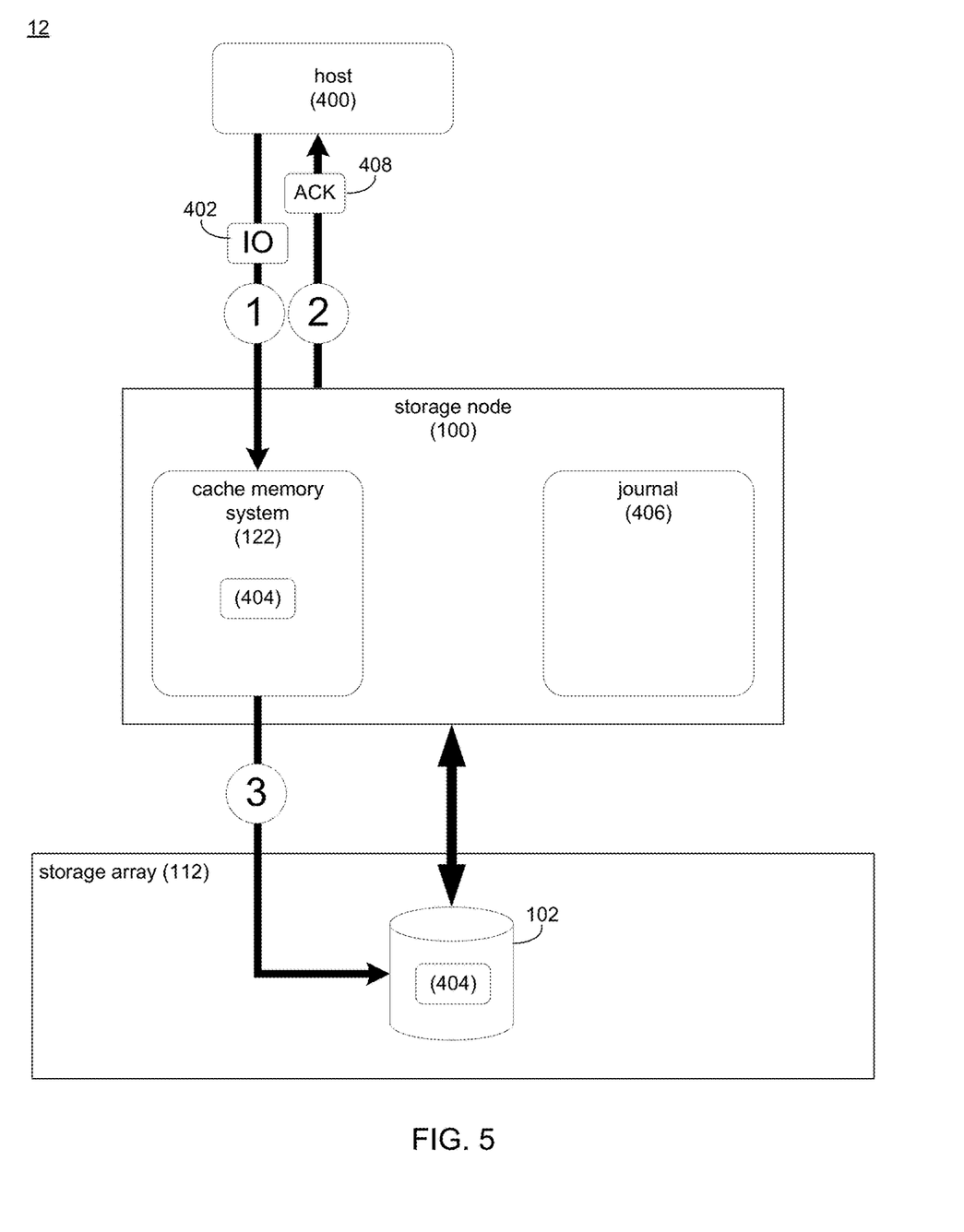

In some implementations and in response to receiving the request for the storage system to enter the testing IO mode from the normal IO write mode, storage management process 10 may write 304 the data to the cache memory system. Referring also to FIG. 5, suppose that storage management process 10 receives a request to enter the testing IO mode. In this example and as discussed above, storage management process 10 may determine that data needs to be written to storage system 12 until the data threshold of e.g., 80% of storage array 112's is exceeded. In response to entering the testing IO mode from the normal IO write mode, storage management process 10 may write 304 data (e.g., data 404 of IO 402) to the cache memory system (e.g., cache memory system 122). This is shown as "1" in FIG. 5.

In some implementations, storage management process 10 may bypass 306 the writing of the data to the journal. Continuing with the above example and in contrast to the normal IO writing mode, storage management process 10 may bypass 306 the writing of data 404 to journal 406. In this manner, storage management process 10 may remove the latency requirements associated with writing data 404 to journal 406.

In some implementations and in response to writing the data to the cache memory system, storage management process 10 may send 308 the acknowledgment signal to the host device. For example, as data 404 is not persisted to journal 406, storage management process 10 may send 308 an acknowledgement signal (e.g., ACK 408) to the host device (e.g., host device 400) indicating that subsequent IO write requests may be processed. This is shown as "2" in FIG. 5.

In some implementations, storage management process 10 may write 310 the data from the cache memory system to the storage array. As discussed above, at some point in time after writing the data to cache memory system 122, data 404 may be "flushed" or written from cache memory system 122 to the persistent memory of the storage array (e.g., storage array 112). This is shown as "3" in FIG. 5. Storage management process 10 may continue this process of writing data from one or more IO write requests until the determined 314 amount and/or type of data is written to storage system 12 and tested according to the selected test(s).

Figure 6:
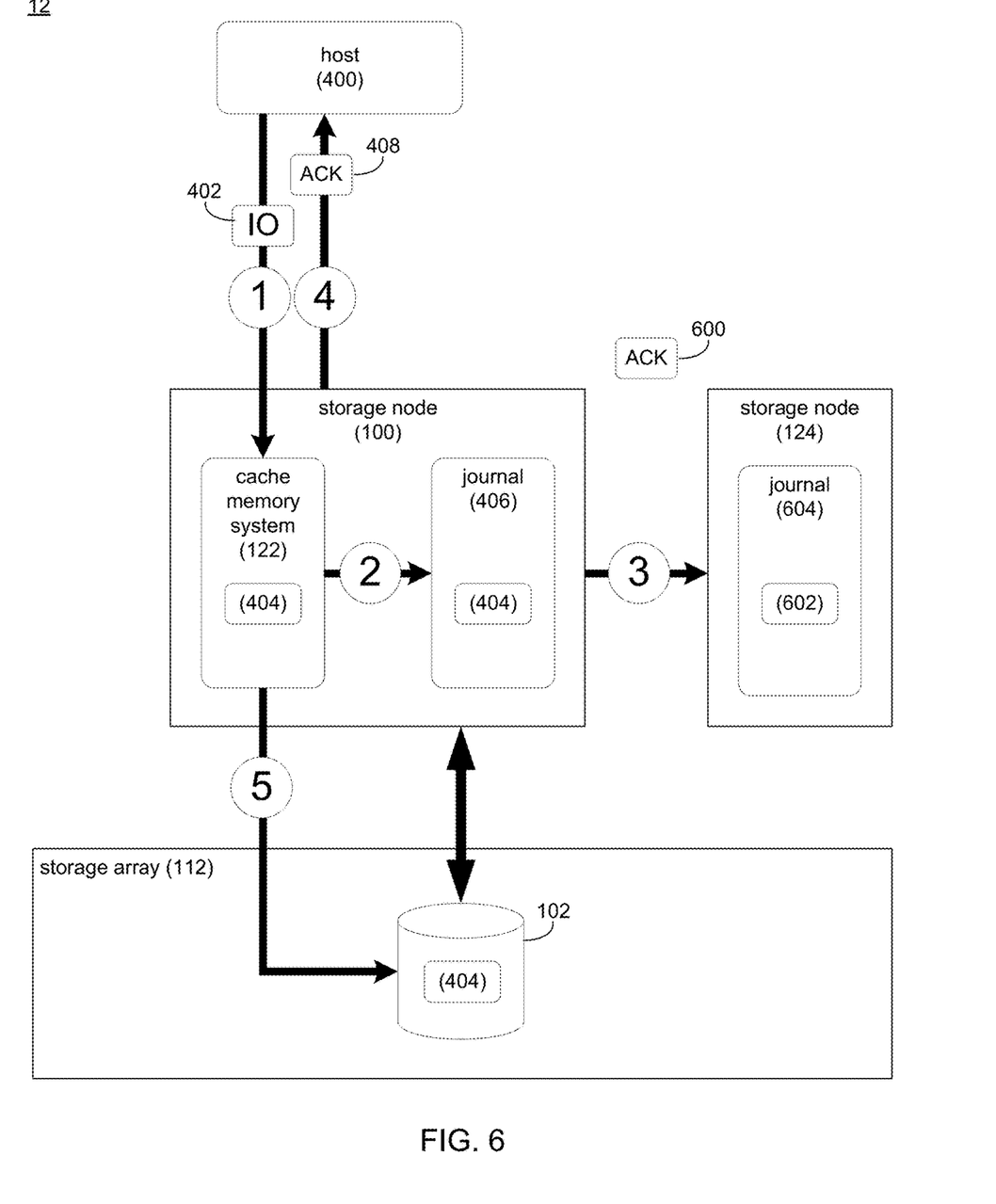

In some implementations, the storage system may include two storage nodes configured in an active-active system, thus defining a multi-node storage system. Referring also to FIG. 6, storage system 12 may include a plurality of storage nodes (e.g., storage nodes 100, 124). In this example, storage nodes 100, 124 may be configured in an active/active system where data on one storage node is mirrored to each other storage node. In some implementations, storage management process 10 may write the data to a cache memory system of a first storage node that processes the IO request and provide a notification of the data written to the first storage node such that the second storage node may generate one or more metadata pages referring to the data written to the first storage node. In this manner, both storage nodes may have access to the data without having duplicate copies of the data in each storage node.

Figure 8:
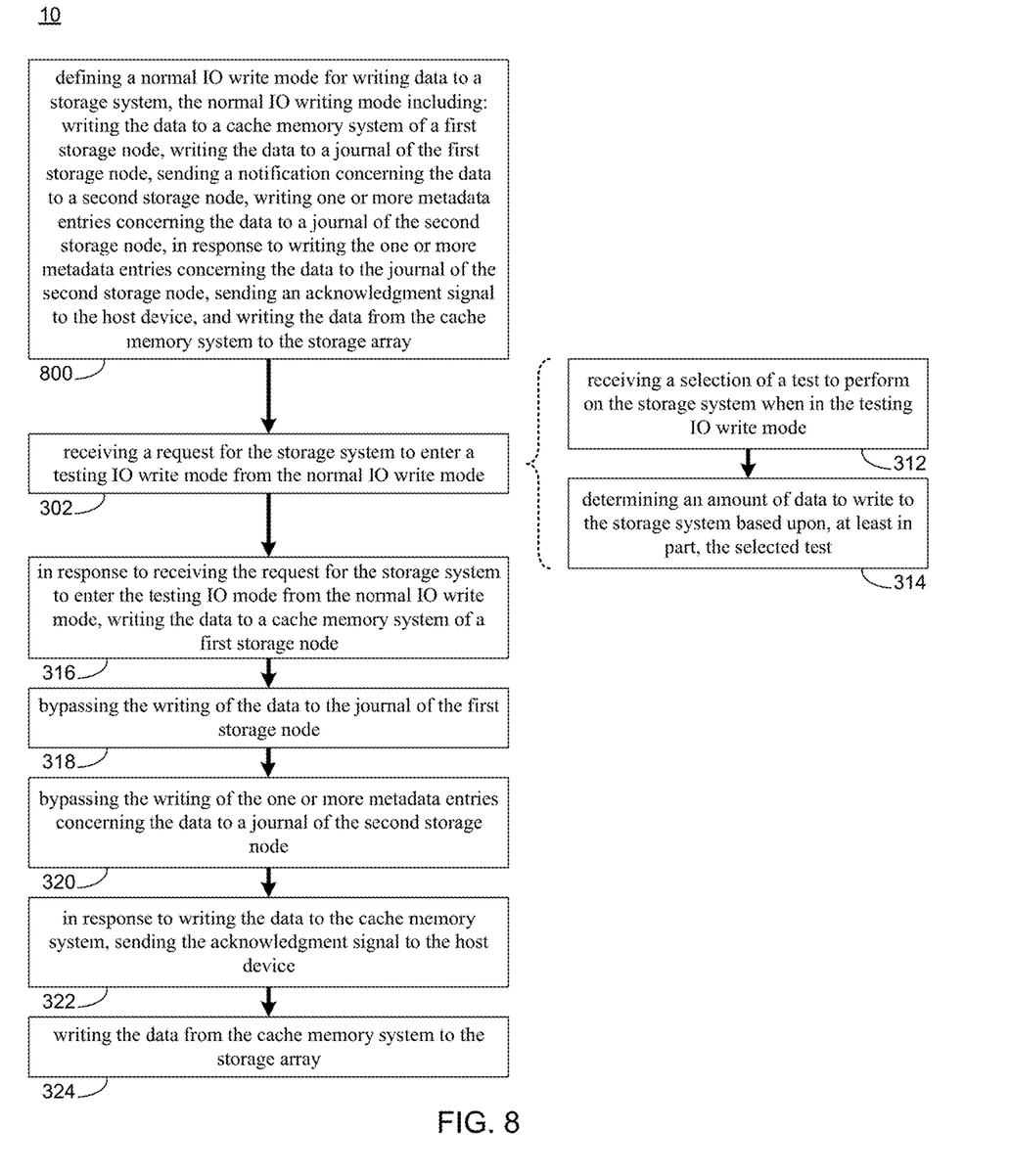
FIG. 8 is an example flowchart of storage management process according to one or more example implementations of the disclosure.

In some implementations, the normal IO write mode for writing data to the multi-node storage system may include: writing the data to a cache memory system of a first storage node; writing the data to a journal of the first storage node; sending a notification concerning the data to a second storage node; writing one or more metadata entries concerning the data to a journal of the second storage node; and, in response to writing the one or more metadata entries concerning the data to the journal of the second storage node, sending an acknowledgment signal to the host device. Referring again to FIG. 6, suppose a host (e.g., host 400) sends an IO request (e.g., IO request 402) to write data to a storage array (e.g., storage array 112) using a storage node (e.g., storage node 100). In this example, storage management process 10 may, in the normal IO write mode, write the data (e.g., data 404) to the cache memory system (e.g., cache memory system 122) of the processing storage node (e.g., storage node 100). This is shown as "1" in FIG. 6. In this manner and as shown in FIG. 8, storage management process 10 may define 800 the normal IO write mode as discussed above.

Storage management process 10 may write the data (e.g., data 404) to a journal (e.g., journal 406). A journal (e.g., journal 406) may include one or more non-volatile random access memory (NVRAM) devices configured to provide a log of the data written to storage array. For example, the contents of the journal may be preserved in the event of a power failure or other failure of the cache memory system. In some implementations and in response to the failure of the cache memory system, storage management process 10 may recover data 404 from the journal (e.g., journal 406). This is shown as "2" in FIG. 6.

Storage management process 10 may send a notification concerning the data to a second storage node (e.g., storage node 124). The notification (e.g., notification 600) may describe the memory address for data 404 within storage array 112. It will be appreciated that notification 600 may also include other information concerning data 404 and/or may include a reference to other information concerning data 404. In response to receiving the notification (e.g., notification 600) at the second storage node (e.g., storage node 124), storage management process 10 may write one or more metadata entries (e.g., metadata entry 602) concerning the data to a journal (e.g., journal 604) of the second storage node (e.g., storage node 124). The journal (e.g., journal 604) may include one or more non-volatile random access memory (NVRAM) configured to form a metadata entry log associated with the processing of IO write requests on the storage system (e.g., storage system 12). While FIG. 6 shows storage node 100 with cache memory system 122, it will be appreciated that storage node 124 may also have a cache memory system (e.g., cache memory system 126) as described above.

Storage management process 10 may send an acknowledgment signal (e.g., ACK 408) to the host device (e.g., host device 400) once the one or more metadata entries (e.g., metadata entry 602) is written to journal 604. This is shown as "4" in FIG. 6. At some point in time after writing the data to cache memory system 122 and journal 406, data 404 may be "flushed" or written from cache memory system 122 to the persistent memory of the storage array (e.g., storage array 112). This is shown as "5" in FIG. 6. As noted above, the journaling process (i.e., writing data to journal 404 and writing metadata entries concerning data to journal 604) may introduce latency delays in the processing of IO write requests on the storage system. However, these latency delays may ensure that, during normal IO write mode, data written to the storage system is persisted even if and when the processing storage node fails and/or during a data corruption event. As discussed above and by contrast, during testing IO write mode, the preservation or persistence of data may be less important than the latency at which the storage system is "filled" for performing one or more tests. In this manner, storage management process 10 may avoid or reduce the processing delays imposed by these data protection processes by selectively bypassing journaling operations.

Figure 7:
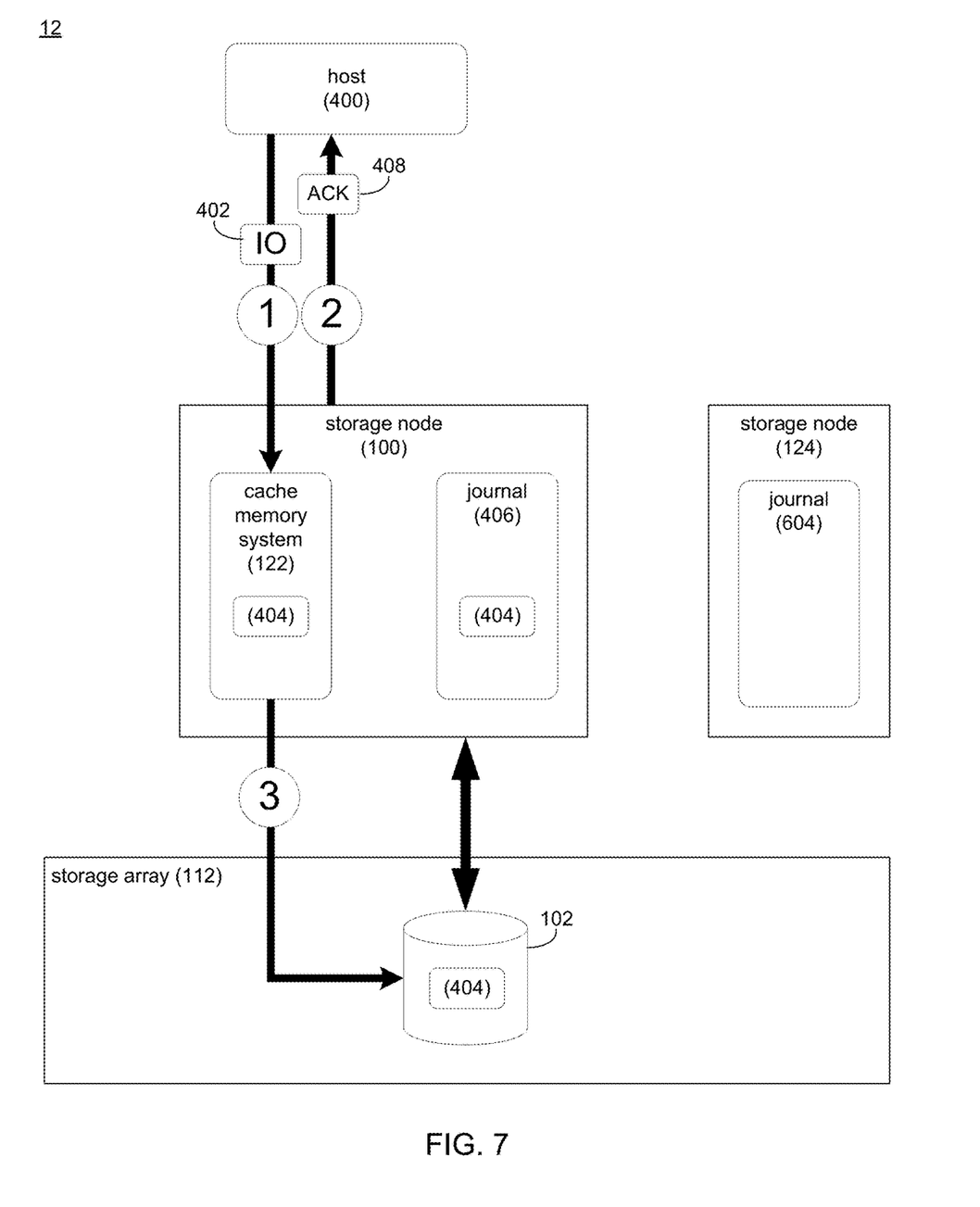

In some implementations, storage management process 10 may, in response to receiving the request for the storage system to enter the testing IO mode from the normal IO write mode, write 316 the data to a cache memory system of a first storage node; bypass 318 the writing of the data to the journal of the first storage node; bypass 320 the writing of the one or more metadata entries concerning the data to the journal of the second storage node; in response to writing the data to the cache memory system, send 322 the acknowledgment signal to the host device; and write 324 the data from the cache memory system to the storage array. For example and as discussed above, in response to receiving the request for the storage system to enter the testing IO mode from the normal IO write mode, storage management process 10 may write 316 the data to the cache memory system. Referring also to FIG. 7, suppose that storage management process 10 receives a request to enter the testing IO mode. In this example and as discussed above, storage management process 10 may determine that data needs to be written to storage system 12 until the data threshold of e.g., 80% of storage array 112's is exceeded. In response to entering the testing IO mode from the normal IO write mode, storage management process 10 may write 316 data (e.g., data 404 of IO 402) to the cache memory system (e.g., cache memory system 122). This is shown as "1" in FIG. 7.

In some implementations, storage management process 10 may bypass 318 the writing of the data to the journal of the first storage node. Continuing with the above example and in contrast to the normal IO writing mode, storage management process 10 may bypass 318 the writing of data 404 to journal 406. In this manner, storage management process 10 may remove the latency requirements associated with writing data 404 to journal 406.

In some implementations, storage management process 10 may send a notification concerning the data to a second storage node (e.g., storage node 124). As discussed above, the notification (e.g., notification 600) may describe the memory address for data 404 within storage array 112. However, in response to receiving the notification (e.g., notification 600) at the second storage node (e.g., storage node 124), storage management process 10 may bypass 320 writing one or more metadata entries concerning the data to the journal (e.g., journal 604) of the second storage node (e.g., storage node 124). In this manner, storage management process 10 may remove the latency requirements associated with writing metadata entries to journal 604. In some implementations, storage management process 10 may forgo sending the notification concerning the data to the second storage node (e.g., storage node 124).

In some implementations and in response to writing the data to the cache memory system, storage management process 10 may send 322 the acknowledgment signal to the host device. For example, as data 404 is not persisted to journal 406 and metadata entries are not written to the journal of a second storage node, storage management process 10 may send 322 an acknowledgement signal (e.g., ACK 408) to the host device (e.g., host device 400) indicating that subsequent IO write requests may be processed. This is shown as "2" in FIG. 7.

In some implementations, storage management process 10 may write 324 the data from the cache memory system to the storage array. As discussed above, at some point in time after writing the data to cache memory system 122, data 404 may be "flushed" or written from cache memory system 122 to the persistent memory of the storage array (e.g., storage array 112). This is shown as "3" in FIG. 7. Storage management process 10 may continue this process of writing data from one or more IO write requests until the determined 314 amount and/or type of data is written to storage system 12 and tested according to the selected test(s).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   defining a normal IO write mode for writing data to a storage system, the normal IO writing mode including:

writing the data to a cache memory system of a first storage node;
writing the data to a journal of the first storage node;
sending a notification concerning the data to a second storage node;
writing one or more metadata entries concerning the data to a journal of the second storage node;
in response to writing the one or more metadata entries concerning the data to the journal of the second storage node, sending an acknowledgment signal to the host device; and
writing the data from the cache memory system to the storage array;
receiving a request for the storage system to enter a testing IO write mode from the normal IO write mode; and
in response to receiving the request for the storage system to enter the testing IO write mode from the normal IO write mode:
writing the data to a cache memory system of the first storage node;
bypassing the writing of the data to the journal of the first storage node; and
in response to writing the data to the cache memory system, sending the acknowledgment signal to the host device.

2. The computer-implemented method of claim 1, wherein the journal includes one or more non-volatile random access memory (NVRAM) devices.

3. The computer-implemented method of claim 1, wherein the request for the storage system to enter the testing IO write mode includes at least one of: a predefined start time for entering the testing IO write mode and a predefined end time for returning to the normal IO write mode.

4. The computer-implemented method of claim 1, further comprising:
receiving a selection of a test to perform on the storage system when in the testing IO write mode.

5. The computer-implemented method of claim 4, further comprising:
determining an amount of data to write to the storage system based upon, at least in part, the selected test.

6. The computer-implemented method of claim 1, wherein the storage system includes two storage nodes configured in an active-active system, thus defining a multi-node storage system.

7. The computer-implemented method of claim 6, further comprising:
in response to receiving the request for the storage system to enter the testing IO mode from the normal IO write mode:
bypassing the writing of the one or more metadata entries concerning the data to the journal of the second storage node;
in response to writing the data to the cache memory system, sending the acknowledgment signal to the host device; and
writing the data from the cache memory system to the storage array.

8. A computer program product residing on a non-transitory computer readable medium having a plurality of instructions stored thereon which, when executed by a processor, cause the processor to perform operations comprising:
defining a normal IO write mode for writing data to a storage system, the normal IO writing mode including:
writing the data to a cache memory system of a first storage node;
writing the data to a journal of the first storage node;
sending a notification concerning the data to a second storage node;
writing one or more metadata entries concerning the data to a journal of the second storage node;
in response to writing the one or more metadata entries concerning the data to the journal of the second storage node, sending an acknowledgment signal to the host device; and
writing the data from the cache memory system to the storage array;
receiving a request for the storage system to enter a testing IO write mode from the normal IO write mode; and
in response to receiving the request for the storage system to enter the testing IO write mode from the normal IO write mode:
writing the data to a cache memory system of the first storage node;
bypassing the writing of the data to the journal of the first storage node; and
in response to writing the data to the cache memory system, sending the acknowledgment signal to the host device.

9. The computer program product of claim 8, wherein the journal includes one or more non-volatile random access memory (NVRAM) devices.

10. The computer program product of claim 8, wherein the request for the storage system to enter the testing IO write mode includes at least one of: a predefined start time for entering the testing IO write mode and a predefined end time for returning to the normal IO write mode.

11. The computer program product of claim 8, wherein the operations further comprise:
receiving a selection of a test to perform on the storage system when in the testing IO write mode.

12. The computer program product of claim 8, wherein the operations further comprise:
determining an amount of data to write to the storage system based upon, at least in part, the selected test.

13. The computer program product of claim 8, wherein the storage system includes two storage nodes configured in an active-active system, thus defining a multi-node storage system.

14. The computer program product of claim 13, wherein the operations further comprise:
in response to receiving the request for the storage system to enter the testing IO mode from the normal IO write mode:
bypassing the writing of the one or more metadata entries concerning the data to the journal of the second storage node;
in response to writing the data to the cache memory system, sending the acknowledgment signal to the host device; and
writing the data from the cache memory system to the storage array.

15. A computing system comprising:
a memory; and
a processor configured to define a normal IO write mode for writing data to a storage system, the normal IO writing mode including: writing the data to a cache memory system of a first storage node, writing the data to a journal of the first storage node, sending a notification concerning the data to a second storage node, writing one or more metadata entries concerning the data to a journal of the second storage node, in response to writing the one or more metadata entries concerning the data to the journal of the second storage node, sending an acknowledgment signal to the host device, and writing the data from the cache memory system to the storage array, wherein the processor is further configured to receive a request for the storage system to enter a testing IO write mode from the normal IO write mode, and wherein the processor is further configured to, in response to receiving the request for the storage system to enter the testing IO write mode from the normal IO write mode: write the data to a cache memory system of the first storage node, bypass the writing of the data to the journal of the first storage node, and in response to writing the data to the cache memory system, send the acknowledgment signal to the host device.

16. The computing system of claim 15, wherein the journal includes one or more non-volatile random access memory (NVRAM) devices.

17. The computing system of claim 15, wherein the request for the storage system to enter the testing IO write mode includes at least one of: a predefined start time for entering the testing IO write mode and a predefined end time for returning to the normal IO write mode.

18. The computing system of claim 15, wherein the processor is further configured to:
  receiving a selection of a test to perform on the storage system when in the testing IO write mode; and
  determining an amount of data to write to the storage system based upon, at least in part, the selected test.

19. The computing system of claim 15, wherein the storage system includes two storage nodes configured in an active-active system, thus defining a multi-node storage system.

20. The computing system of claim 19, wherein the processor is further configured to:
  in response to receiving the request for the storage system to enter the testing IO mode from the normal IO write mode:
    bypass the writing of the one or more metadata entries concerning the data to the journal of the second storage node;
    in response to writing the data to the cache memory system, send the acknowledgment signal to the host device; and
    write the data from the cache memory system to the storage array.

* * * * *